(12) United States Patent
Maegawa

(10) Patent No.: US 11,255,654 B2
(45) Date of Patent: Feb. 22, 2022

(54) MISALIGNMENT DETERMINING DEVICE

(71) Applicants: BIG DAISHOWA CO., LTD., Osaka (JP); BIG DAISHOWA SEIKI CO., LTD., Osaka (JP)

(72) Inventor: Naoki Maegawa, Osaka (JP)

(73) Assignees: BIG DAISHOWA CO., LTD., Osaka (JP); BIG DAISHOWA SEIKI CO., LTD., Osaka (JP)

( * ) Notice: Subject to any disclaimer, the term of this patent is extended or adjusted under 35 U.S.C. 154(b) by 0 days.

(21) Appl. No.: 17/049,192

(22) PCT Filed: Aug. 23, 2018

(86) PCT No.: PCT/JP2018/031137
§ 371 (c)(1),
(2) Date: Oct. 20, 2020

(87) PCT Pub. No.: WO2020/039539
PCT Pub. Date: Feb. 27, 2020

(65) Prior Publication Data
US 2021/0254956 A1    Aug. 19, 2021

(51) Int. Cl.
*G01B 5/25* (2006.01)
*B23Q 17/22* (2006.01)
*B23Q 3/12* (2006.01)

(52) U.S. Cl.
CPC ............ *G01B 5/25* (2013.01); *B23Q 17/2216* (2013.01); *B23B 2260/128* (2013.01); *B23Q 3/12* (2013.01)

(58) Field of Classification Search
CPC ........ G01B 5/25; G01B 3/22; B23Q 17/2216; B23Q 3/12; B23Q 17/22; B23B 2260/128

USPC ......................................................... 33/640
See application file for complete search history.

(56) References Cited

U.S. PATENT DOCUMENTS

| | | |
|---|---|---|
| 3,102,343 A | 9/1963 | Plank |
| 3,914,869 A | 10/1975 | Merz et al. |
| 4,031,632 A | 6/1977 | Lendi et al. |
| 4,439,925 A | 4/1984 | Lock |

(Continued)

FOREIGN PATENT DOCUMENTS

| | | |
|---|---|---|
| CN | 1178901 A | 4/1998 |
| CN | 102468941 A | 8/2011 |

(Continued)

OTHER PUBLICATIONS

International Search Report.
(Continued)

*Primary Examiner* — Yaritza Guadalupe-McCall
(74) *Attorney, Agent, or Firm* — Dilworth & Barrese, LLP

(57) ABSTRACT

Provided is a misalignment determining device having a size thereof in an axial direction being made short. The misalignment determining device includes a case, a dial gauge, a holder portion, a support portion, a pivotal portion, a lever member, and a slide member. The slide member is placed in contact with a stylus of the dial gauge. While the pivotal portion and the lever member are rotated in synchronism with rotation of the holder portion, a pivot amount of the pivotal portion is transmitted to the slide member via the lever member, and based on an amount of movement of the slide member along an axis direction, the dial gauge determines the pivot amount.

3 Claims, 13 Drawing Sheets

(56) References Cited

U.S. PATENT DOCUMENTS

| | | | |
|---|---|---|---|
| 5,960,552 A | 10/1999 | Ishii | |
| 6,209,212 B1* | 4/2001 | Uchida | H02K 7/14 33/412 |
| 10,086,485 B2* | 10/2018 | Itani | B23Q 3/15773 |
| 10,830,569 B2* | 11/2020 | Maegawa | B23Q 17/22 |
| 2011/0162444 A1 | 7/2011 | Yamamoto et al. | |
| 2011/0232116 A1 | 9/2011 | Nagata | |
| 2016/0346884 A1* | 12/2016 | Itani | B23Q 3/15773 |
| 2019/0113323 A1* | 4/2019 | Maegawa | B23Q 3/186 |
| 2019/0118269 A1* | 4/2019 | Nakatani | B23B 31/201 |
| 2019/0381577 A1* | 12/2019 | Nakatani | B23B 31/20 |
| 2021/0254956 A1* | 8/2021 | Maegawa | B23Q 17/2216 |

FOREIGN PATENT DOCUMENTS

| | | | |
|---|---|---|---|
| CN | 202393334 U | | 8/2012 |
| CN | 203405165 U | | 1/2014 |
| CN | 106482619 A | | 3/2017 |
| CN | 107631674 A | | 1/2018 |
| GB | 813075 A | | 5/1959 |
| GB | 892172 A | | 3/1962 |
| GB | 1311922 A | | 3/1973 |
| GB | 1416776 A | | 12/1975 |
| GB | 1454621 A | | 11/1976 |
| GB | 1523792 A | | 9/1978 |
| JP | S47-18882 U | | 11/1972 |
| JP | S59-89202 U | | 6/1984 |
| JP | S63-195203 U | | 12/1988 |
| JP | H05-269520 A | | 10/1993 |
| JP | H7-227741 A | | 8/1995 |
| JP | 2005-098837 A | | 4/2005 |
| JP | 2011-209063 A | | 10/2011 |
| JP | 2020153720 A | * | 9/2020 |
| SU | 663491 A1 | | 5/1979 |
| WO | 2018/020646 A1 | | 2/2018 |

OTHER PUBLICATIONS

Written Opinion of the International Searching Authority.
First Chinese Office Action from Chinese Patent Application No. 201880093152.7 dated Sep. 24, 2021.
Korean Office Action from Korean Patent Application No. 10-2020-7030221 dated Nov. 22, 2021.

* cited by examiner

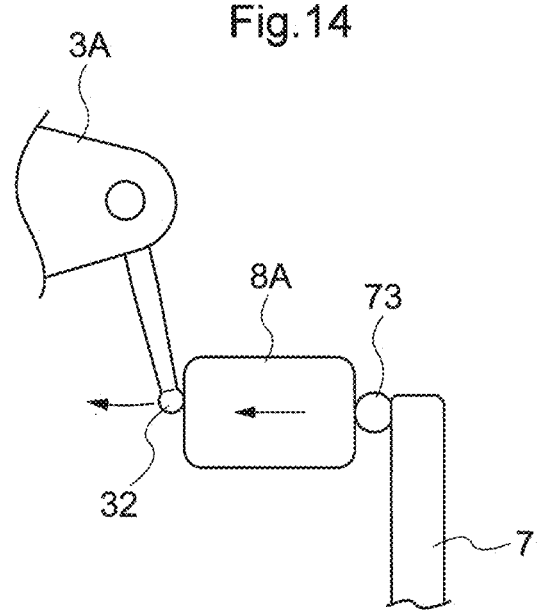

MISALIGNMENT DETERMINING DEVICE

TECHNICAL FIELD

This disclosure relates to a misalignment determining device for use in determining misalignment of a tool holder mounting portion of a lathe or the like.

BACKGROUND ART

In a lathe or the like, while a base end portion of a work is gripped by a chuck of a rotary base, the work will be pressed in an axial direction by a center of a tailstock. Under this condition, in order to be able to lathe-turn the work rotated about the axis from the lateral side thereof with high precision by a cutter blade, agreement between the center of the chuck and the core (center axis) of the center in the direction perpendicular to the axial direction is required. To this end, there is disclosed a misalignment determining device configured to determine a positional misalignment of the core of the center relative to the center of the chuck in the direction perpendicular to the axial direction (see PTL 1 for example).

A misalignment determining device described in PTL 1 includes a cylindrical case, a dial gauge, a cylindrical holder body fitted in a through hole of the case, a support body attached to the base end side of the holder body, a slider body slidable along the axial direction on the radial inner side of the holder body, and a pivotal body held to the holder body and configured to transmit a pivot amount to the slider body.

In operation, this misalignment determining device will be attached to the rotary base gripped by the chuck and a cup-shaped guide body will be attached in place of the center of the tailstock and then the rotary base will be rotated with keeping the slider body in contact with an inner circumferential face of the guide body, whereby the pivotal body will be rotated together with the holder body. In the course of this, the slider body to which the pivot amount of the pivotal body placed in contact with the inner circumferential face of the guide body has been transmitted is moved in the axial direction and a radial extension portion provided on the side of the base end of the slider body comes into contact with the stylus (probe) of the dial gauge, whereby the pivot amount of the pivotal body is determined. As a result of this determination, if it is found the pivot amount of the pivotal body is constant, this means that the core axis of the center has no positional displacement relative to the center of the chuck in the direction perpendicular to the axial direction. For this reason, the position of the center will be adjusted until the pivot amount of the pivotal body becomes constant.

CITATION LIST

Patent Literature

PTL 1: International Publication No. 2018/020646

SUMMARY

Technical Problem

The misalignment determining device described in PTL 1 is configured to determine a pivot amount of the pivotal body by moving the slider body in the axial direction. So, its size in the axial direction is large. For this reason, the misalignment determining device described in PTL 1 cannot be used for a lathe or the like in which a distance between a tool holder mounting portion and a chuck is small.

Then, there is a need for a misalignment determining device with its size in the axial direction being made short through a simple arrangement.

Solution to Problem

According to a characterizing feature of a misalignment determining device relating to the present disclosure, the misalignment determining device comprises:

a tubular case having a through hole extending along an axis;

a dial gauge fixed to the case with a graduation scale portion thereof being exposed from the case and configured to determine a change amount of a distance;

a holder portion inserted to the through hole and rotatable relative to the case coaxially with the axis;

a support portion that supports the holder portion on a base end side of the holder portion;

a pivotal portion pivotable as being held to a leading end side of the holder portion;

a lever member extending along an intersecting direction intersecting the axial direction at a position which is on the leading end side and which also is on a side closer to the base end side than the pivotal portion is, the lever member being held to the holder portion in such a manner to be pivotable about a pivot axis which is in a direction perpendicular to both the axial direction and the intersecting direction, a pivot amount of the pivotal portion being transmitted to the lever member; and a slide member accommodated in the case at a position on more base end side than the lever member and configured to come into contact with the lever member to be movable along the axial direction;

wherein the slide member is placed in contact with a stylus of the dial gauge;

as the pivotal portion and the lever member are rotated in synchronism with rotation of the holder portion, a pivot amount of the pivotal portion is transmitted to the slide member via the lever member; and based on a movement amount of the slide member along the axial direction, the dial gauge determines the pivot amount.

With the above-described configuration, if misalignment is present with the determination target, the pivot amount of the pivotal portion is not constant and this pivot amount is transmitted to the slide member via the lever member which is rotated in synchronism with the holder portion. And, in association with the movement of the slide member, the dial gauge detects the pivot amount. More particularly, as the pivotal portion held to the leading end side of the holder portion rotated coaxially with the axis is pivoted, the pivot amount transmitted to the lever member extending in the direction intersecting the axial direction is detected as a slide movement amount of the slide member. In this way, since the extending direction of the lever member to which the pivot amount of the pivotal portion is transmitted is a direction that intersects the axial direction, the size in the axial direction can be made shorter than the case of the conventional arrangement in which the attaching direction of the slider body to which the pivot amount is transmitted is aligned with the axial direction.

According to a further characterizing feature, the inventive device further comprises:

a unit amount converter member fixed to the pivotal portion at a position between the pivotal portion and the lever member and configured to change a unit movement amount of the slide member relative to a unit pivot amount of the pivotal portion.

When the size of the pivotal portion in the axial direction becomes greater, the unit movement amount of the slide member relative to the unit pivot amount of the pivotal portion becomes smaller and the amount of change of the stylus of the dial gauge relative to the pivot amount of the pivotal portion becomes smaller. If an attempt were made to increase the unit movement amount of the slide member relative to the unit pivot amount of the pivotal portion by increasing the radial size of the lever member, there would arise a risk of inviting undesirable enlargement of the misalignment determining device in the radial direction.

On the other hand, with the above-described inventive arrangement in which a unit amount converter member configured to change a unit movement amount of the slide member relative to a unit pivot amount of the pivotal portion is fixed to the pivotal portion, even when the pivot amount transmitted to the slide member via the lever member has been changed due to a change made in the size of the pivotal portion in the axial direction, the unit movement amount of the slide member relative to the unit pivot amount of the pivotal portion can be easily changed simply by changing the shape of the unit amount converter member. Therefore, even in case the size of the pivotal portion in the axial direction is increased, the unit movement amount of the slide member relative to the unit pivot amount of the pivotal portion can be increased without increasing the size of the lever member in the radial direction. Consequently, it becomes possible to provide a misalignment determining device which is formed compact not only in its size in the axial direction, but also in its size in the radial direction. Thus, even in case the size of the pivotal portion in the axial direction has been increased, it is still possible to form the device in the same size.

According to a still further characterizing feature, the stylus has an outer face having an arcuate cross section, and a portion of the slide member which comes into contact with the stylus has an inclined portion which is closer to the axis as it extends toward the base end side.

With the above-described inventive arrangement in which an inclined portion is provided at the portion of the slide member which portion comes into contact with the stylus, the movement amount of the slide member in the axial direction is detected by the dial gauge as a movement amount in the direction perpendicular to the axial direction. Therefore, in case e.g. a spindle type dial gauge is employed, it is possible to arrange this dial gauge in the direction perpendicular to the axial direction in the outer face of the case. Thus, there occurs no increase in the size in the axial direction due to the dial gauge. Moreover, since the outer face of the stylus has an arcuate cross section, the contact between the stylus and the inclined portion can occur smoothly, whereby increase of the service lives of the stylus and the slide member is made possible.

BRIEF DESCRIPTION OF DRAWINGS

FIG. 14 is a partially enlarged section view of a misalignment determining device relating to Further Embodiment 2.

DESCRIPTION OF EMBODIMENTS

Next, an embodiment of a misalignment determining device relating to this disclosure will be explained with reference to the accompanying drawings. In this embodiment, there will be explained an exemplary case in which a misalignment determining device 1 is used in a lathe as a machine tool. However, it is noted the invention is not limited to the following embodiment, but various modifications thereof are possible within a range not deviating from the essence thereof.

(Basic Configuration)

Figure 1:
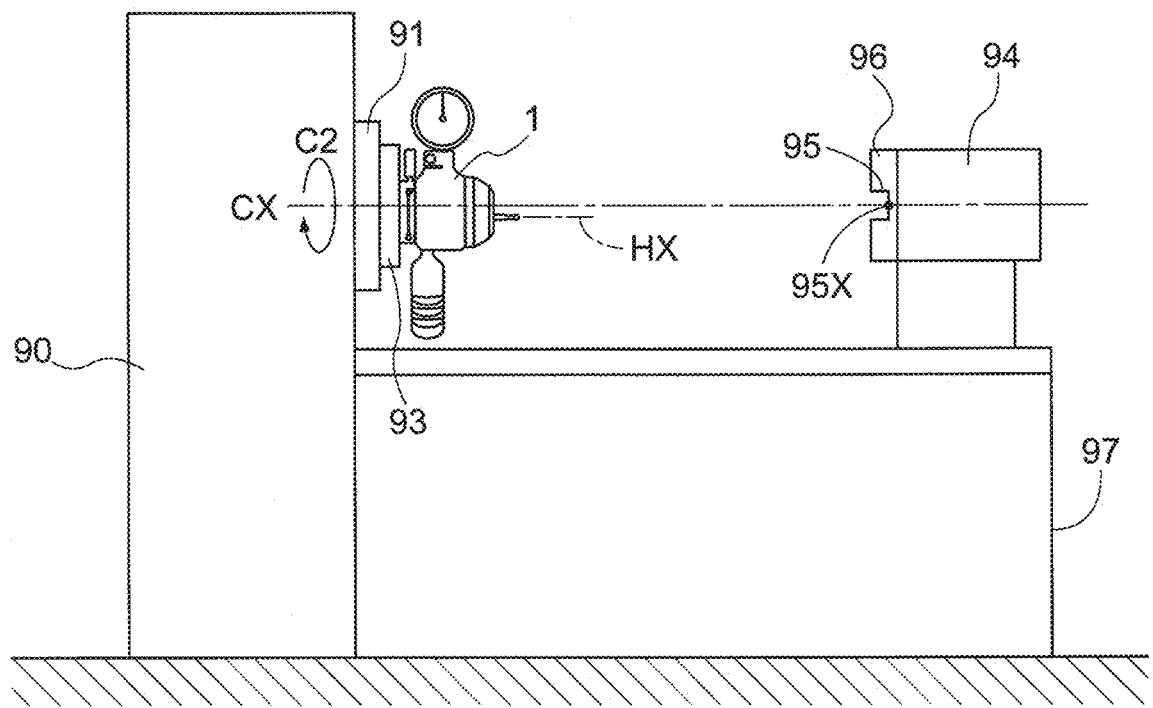
FIG. 1 is a front view showing a general arrangement of a misalignment determining device.

In FIG. 1, for a rotary drive device 90 for rotating a chuck 91 about a spindle axis CX and at a position opposed to the rotary drive device 90 in the direction of this spindle axis CX, there is provided a tool rest 94 to which a tool keeper 96 is attached. And, the rotary drive device 90 and the tool rest 94 are coupled to each other via a base 97 in the spindle axis CX direction. With such lathe as described above, a base end portion of a work (not shown) as an object subjected to a (lathe) turning will be gripped by the chuck 91 with the misalignment determining device 1 being removed therefrom and then this work will be fixed in the spindle axis CX direction. Thereafter, the rotary drive device 90 will be activated, whereby the work will be rotated about the spindle axis CX and also this rotated work will be lathe-turned and cut progressively by a cutter tool (not shown) mounted to the tool keeper 96. The cutter tool is held in a tool holder (not shown) fixed to a tool holder mounting portion 95 provided in the form of a hole defined in the surface of the tool keeper 96. For accurate lathe-turning of the work, it is necessary to establish agreement between the spindle axis CX of the chuck 91 and a center 95X of the tool holder mounting portion 95 in the direction perpendicular to the spindle axis CX direction.

Figure 2:
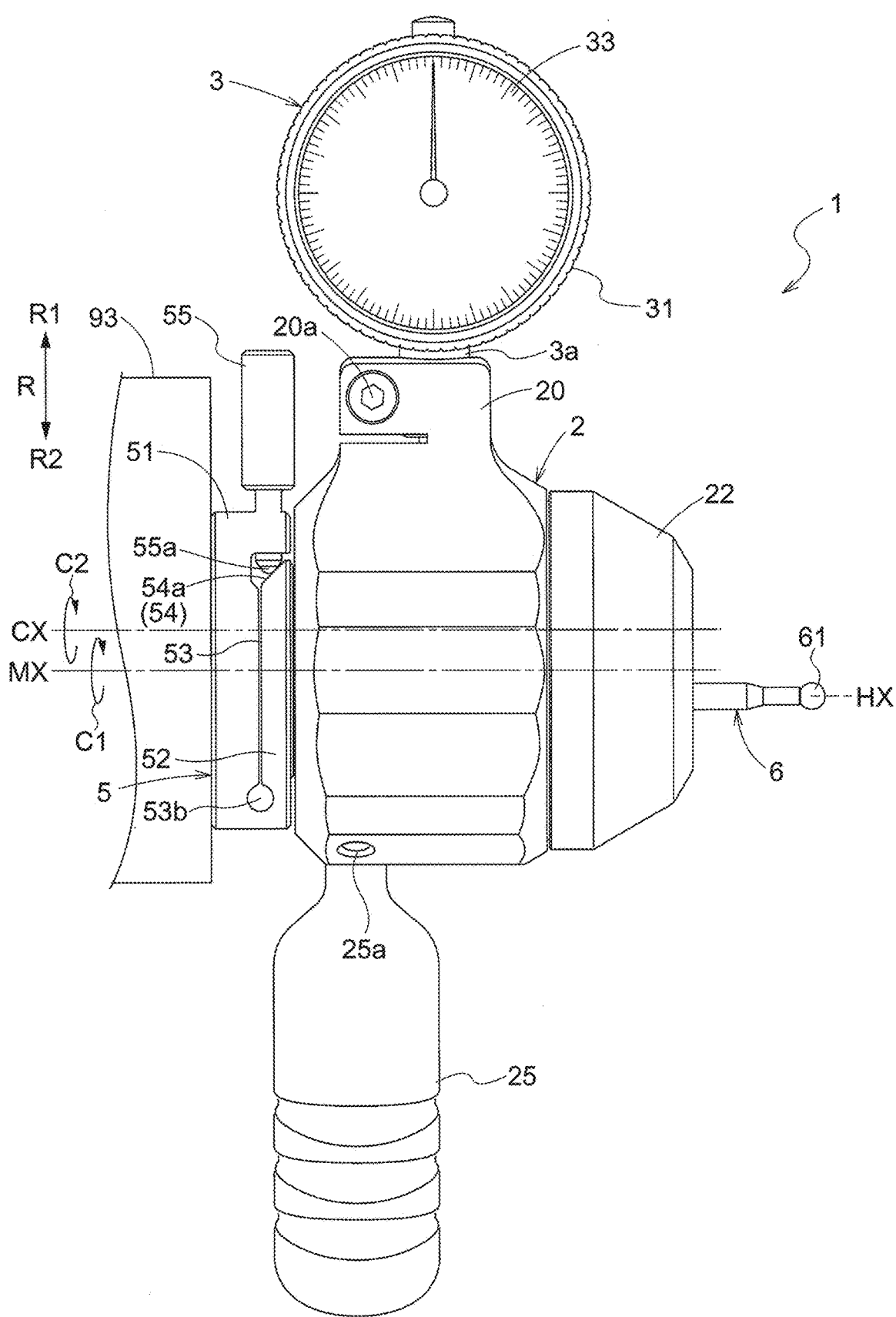
FIG. 2 is a front view of the misalignment determining device.

Then, the misalignment determining device 1 of this embodiment is configured to determine misalignment of the center 95X of the tool holder mounting portion 95 relative to the spindle axis CX, prior to lathe-turning of the work. The misalignment determining device 1 is attached to a disc-shaped rotary base 93 gripped to the chuck 91. Incidentally, the spindle axis CX shown in FIG. 1 is a main (spindle) axis CX as a rotational axis for the rotary drive device 90 to rotate the chuck 91. A rotational axis MX (an example of axis) of the misalignment determining device 1 shown in FIG. 2 is identical to the spindle axis CX or turns about the spindle axis CX. Here, the circumferential direction centering about this rotational axis MX will be defined as a first circumferential direction C1 and a circumferential direction centering about the spindle axis CX will be defined as a second circumferential direction C2, respectively. Further, a "radial direction R" refers to the direction perpendicular to the rotational axis MX; and the direction away from the rotational axis MX along the radial direction R will be defined as a radially outer direction R1, and the direction approaching the rotational axis MX will be defined as a radially inner direction R2, respectively.

As shown in FIGS. 2 through 9, the misalignment determining device 1 includes a case 2, a dial gauge 3, a holder portion 4, a support portion 5, a pivotal portion 6, a lever member 7, and a slide member 8. The misalignment determining device 1 further includes a unit amount converter member 9 configured to change a unit movement amount of the slide member 8 relative to a unit pivot amount of the pivotal portion 6.

Figure 3:
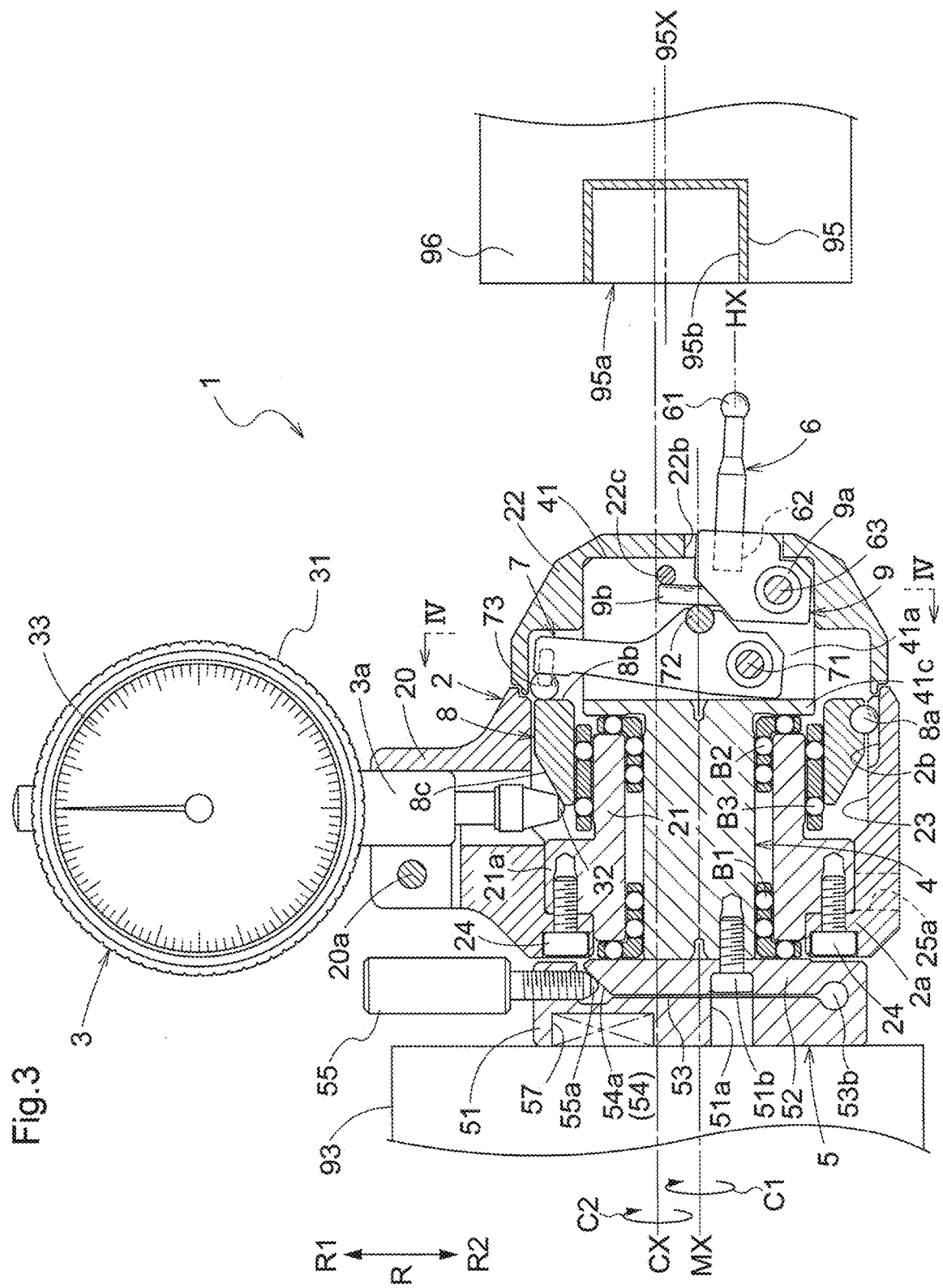
FIG. 3 is a vertical section view of the misalignment determining device.
Figure 4:
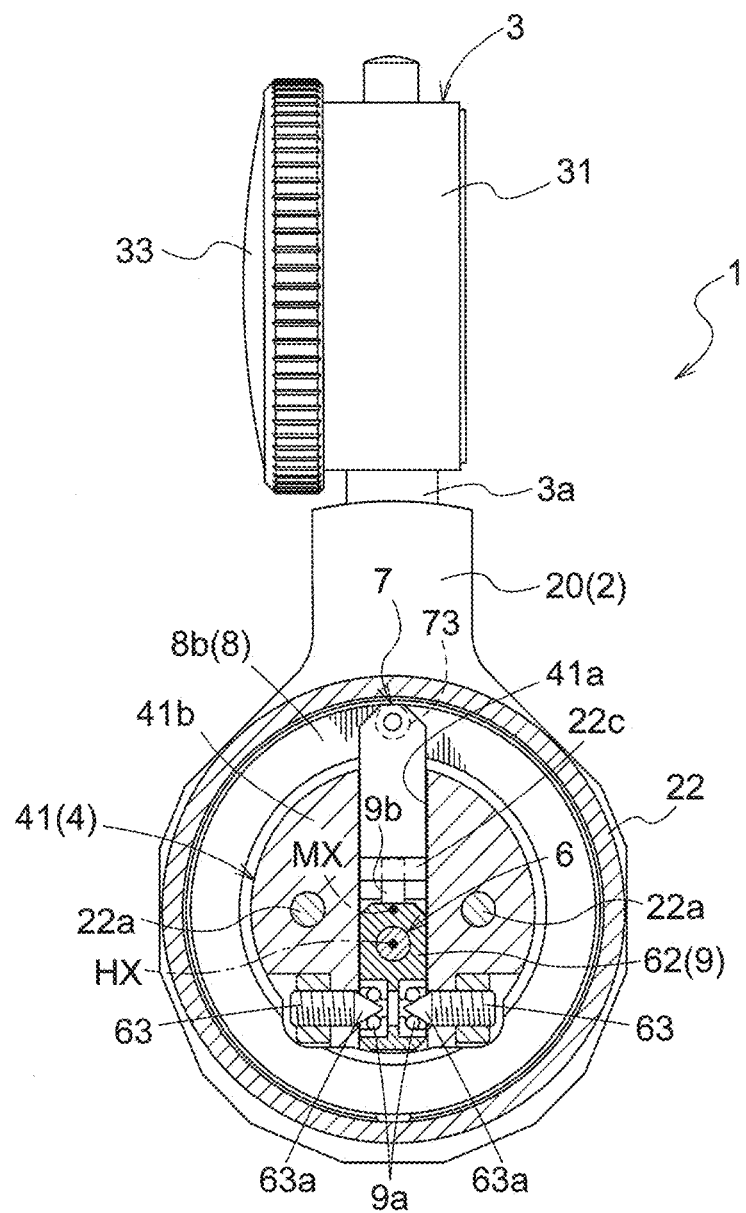
FIG. 4 is a section view taken along IV-IV in FIG. 3.
Figure 5:
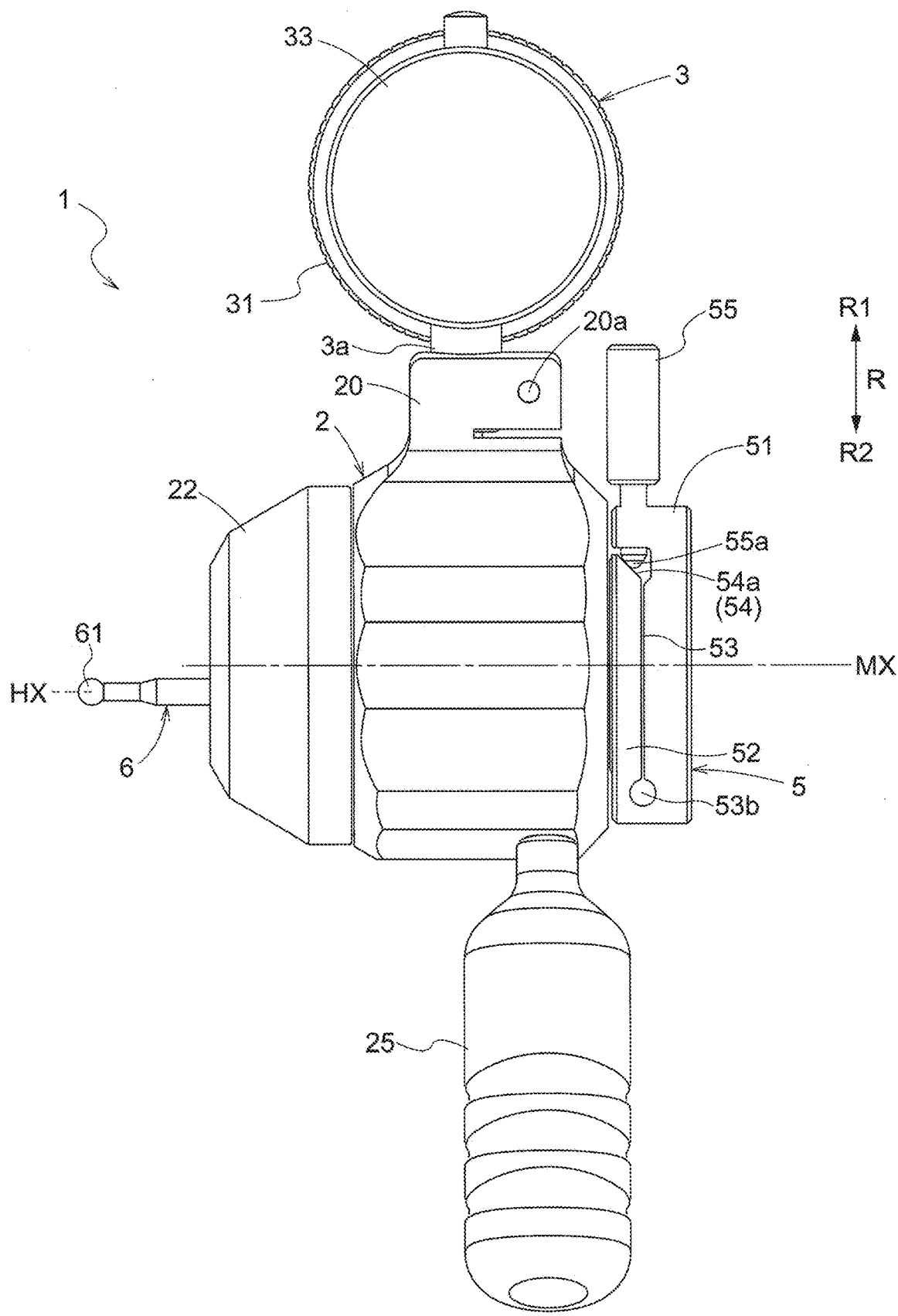
FIG. 5 is a rear view of the misalignment determining device.
Figure 6:
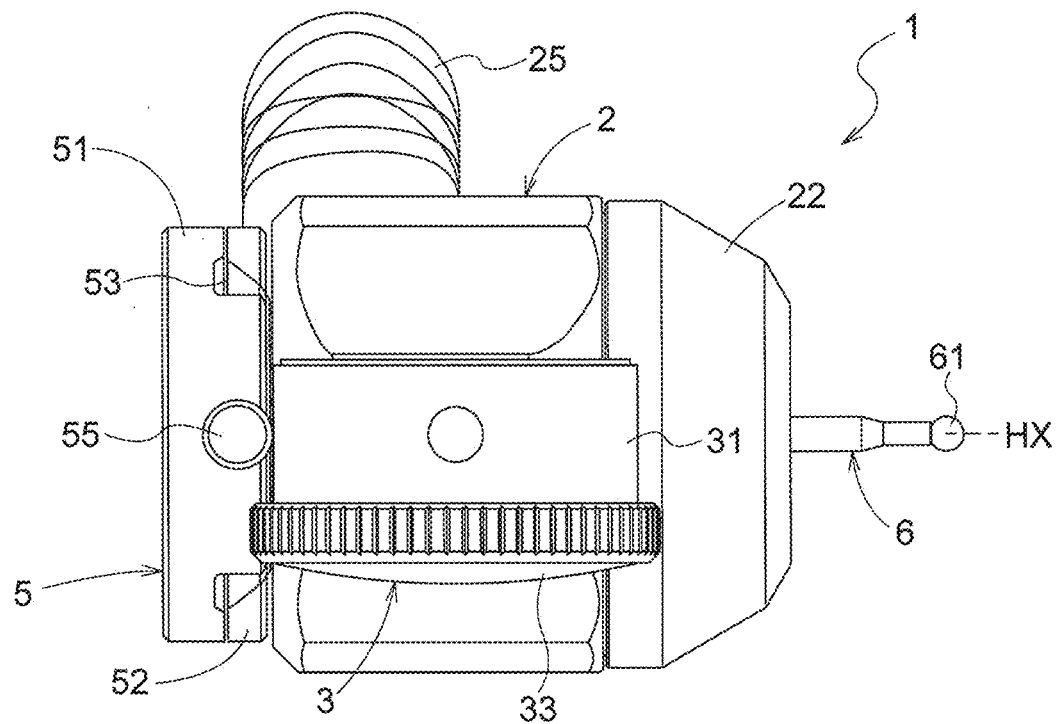
FIG. 6 is a plan view of the misalignment determining device.
Figure 7:
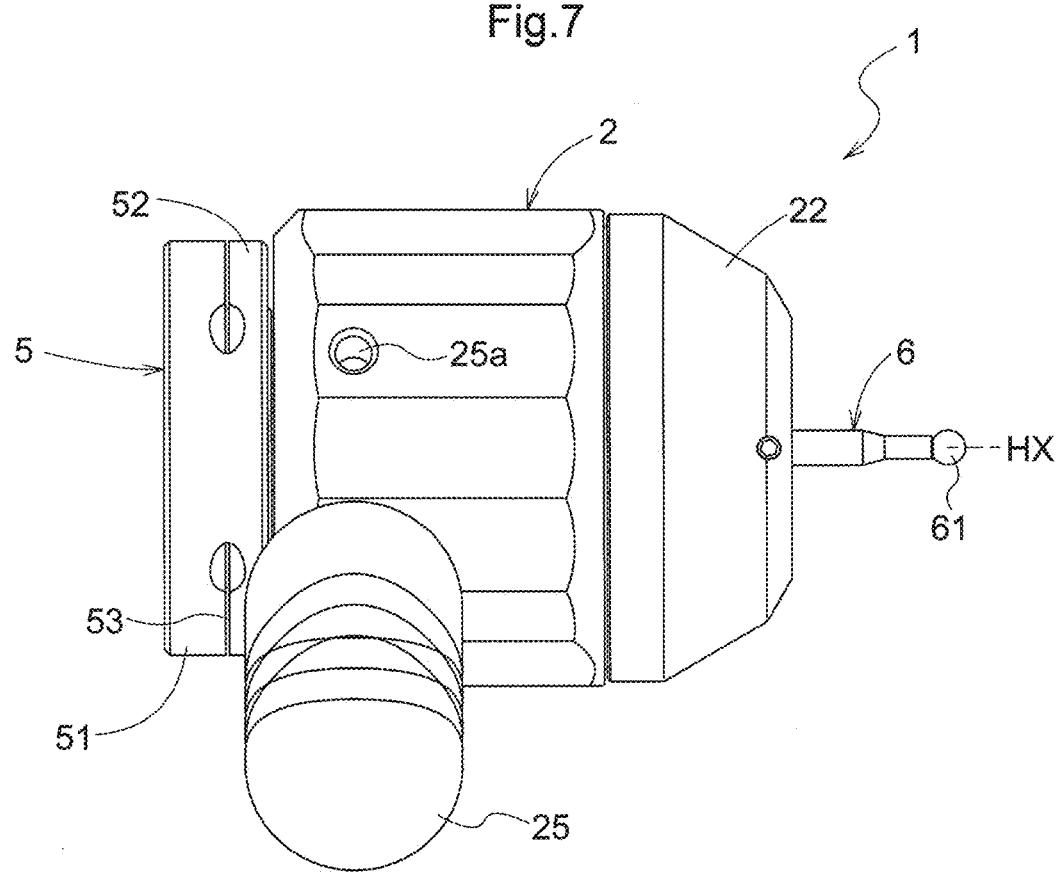
FIG. 7 is a bottom view of the misalignment determining device.
Figure 8:
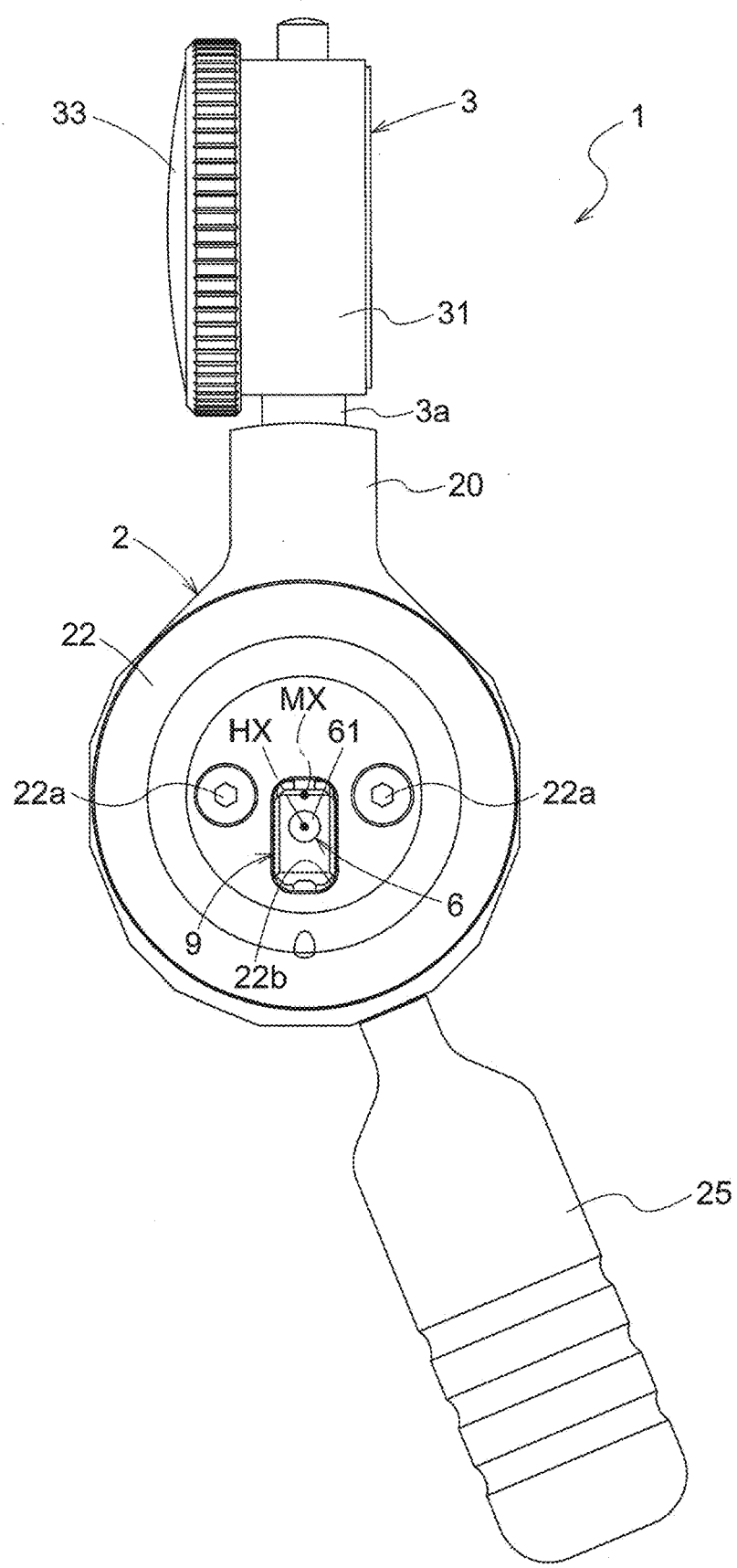
FIG. 8 is a right side view of the misalignment determining device.
Figure 9:
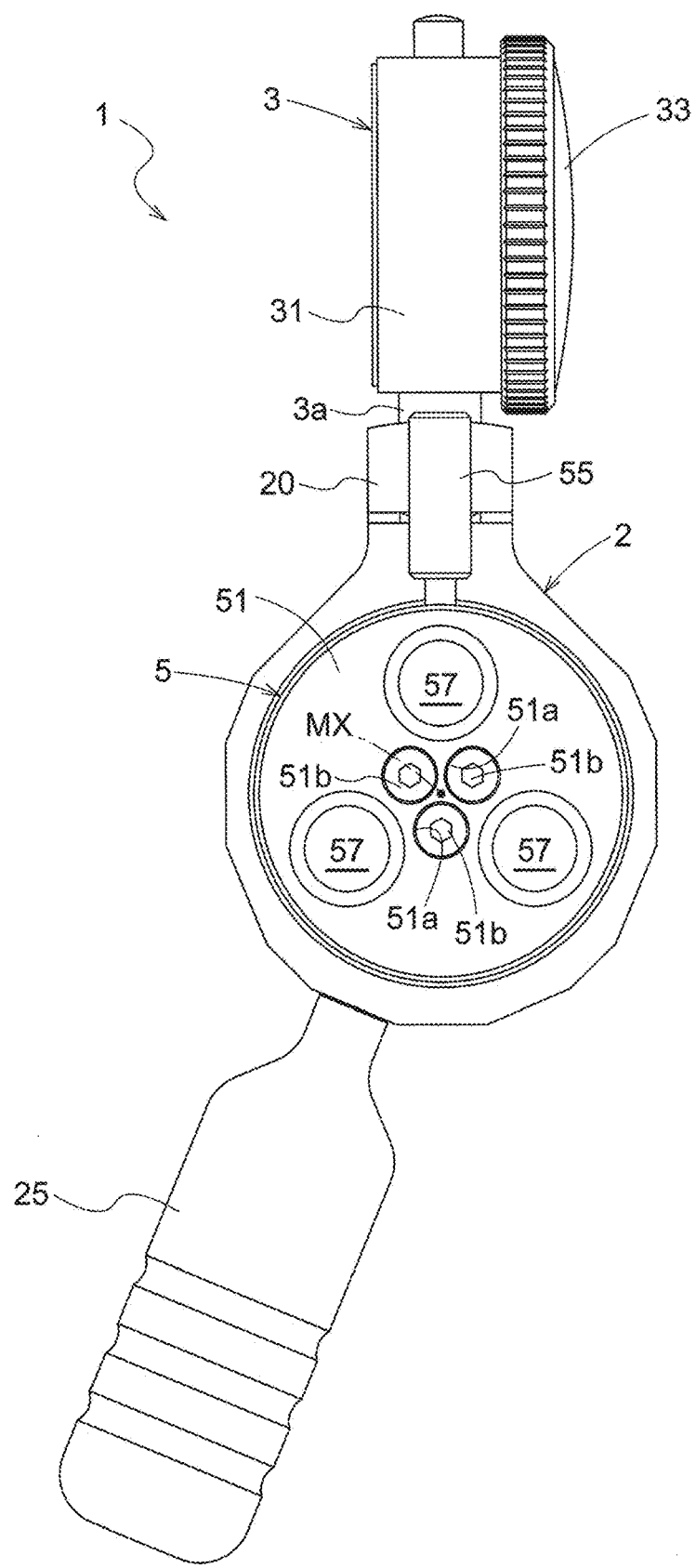
FIG. 9 is a left side view of the misalignment determining device.

As shown in FIGS. 2-3 and FIG. 5, the case 2 is formed like a cylinder having a through hole 23 extending therethrough along the rotational axis MX. In the case 2, there is fixed, with a screw 20a, a stem 3a of the dial gauge 3 as being clamped by a fixing portion 20 which protrudes in the radially outer direction R1. In this embodiment, there is employed the dial gauge 3 of a spindle type whose pointer pivots depending on a protruding amount and a retracting amount of a stylus 32 having an outer face with an arcuate cross section. The dial gauge 3 has a well-known construction arranged such that a small movement amount of the stylus 32 is displayed with enlargement by means of a gear mechanism (not shown) on an indicator 33 (an example of graduation scale portion) provided in its main body 31. Namely, the dial gauge 3 is fixed to the case 2 with its indicator 33 being exposed from the case 2 and determines a change amount of a minute distance.

In the case 2, there is formed a flange portion 2a which protrudes in the form of a circular ring in the radially inner direction R2 so as to define one opening (opening on the support portion 5 side). To this flange portion 2a, a protruding portion 21a which protrudes in the form of a circular ring in the radially outer direction R1 in a cylindrical bearing support body 21 is fixed via a plurality of screws 24. At one end portion of the bearing support body 21 (the end portion on the support portion 5 side), a first bearing B1 is disposed between the base end side (support portion 5 side) of the holder portion 4 and the support portion 5. Further, at the other end of the bearing support body 21 (the end portion on the pivotal portion 6 side), a second bearing B2 is arranged between this end and the holder portion 4 and a third bearing B3 is arranged between this end and the slide member 8.

The bearings B1, B2, B3 employed in this embodiment are constituted of a plurality of balls held by keepers. The first bearing B1 and the second bearing B2 are formed in L-shape, whereas the third bearing B3 is formed linear. Via the first bearing B1 and the second bearing B2, the holder portion 4 and the support portion 5 are rendered freely rotatable relative to the bearing support body 21 which is fixed to the case 2. At the time of this relative rotation, as the first bearing B1 and the second bearing B2 are formed in L-shape, the positions of the first bearing B1 and the second bearing B2 in the circumferential direction and the axial direction are maintained constant. Further, via the third bearing B3, the slide member 8 is rendered freely movable relative to the bearing support body 21 along the rotational axis MX direction. Incidentally, desirably, the respective bearings B1, B2, B3 should have no gaps therein.

The one side opening of the case 2 is closed by the support portion 5 which is not in contact with the case 2. The other side opening of the case 2 is closed by a lid portion 22 which is not in contact with the case 2. The lid portion 22 is formed like a cup; and as its bottom portion is fixed to the holder portion 4 with a plurality of screws 22a, the lid portion 22 is rotatable together with the holder portion 4 (see FIG. 4 and FIG. 8). At the bottom portion of the lid portion 22, there is formed a bore portion 22b through which the pivotal portion 6 can extend pivotally.

As shown in FIG. 3, the holder portion 4 is inserted in the through hole 23 of the case 2 in the radially inner direction R2 of the bearing support body 21. Specifically, the holder portion 4 is supported to the bearing support body 21 which is fixed to the case 2 via the first bearing B1 and the second bearing B2. Thus, the holder portion 4 is rendered rotatable relative to the case 2 about the rotational axis MX. The holder portion 4 is provided in the form of a solid cylinder which extends along the rotational axis MX and is fixed (supported) on its base end side to the support portion 5 and holds, on its leading end side (pivotal portion 6 side), the pivotal portion 6, the lever member 7 and the lid portion 22. In the holder portion 4, at its leading end portion 41 that holds the pivotal portion 6, the lever member 7 and the lid portion 22, an accommodating portion 41a which accommodates the pivotal portion 6 and the lever member 7 and a fixing portions 41b which is fixed via the screws 22a to the lid portion 22 on the opposed sides of the accommodating portion 41a are connected via a flange portion 41c (see FIGS. 3-4). The accommodating portion 41a is provided in the form of an elongate groove that intersects the rotational axis MX perpendicularly and has its longitudinal direction along the attaching direction of the dial gauge 3. Further, in the accommodating portion 41a, a stopper pin 22c fixed to the fixing portion 41b protrudes and this stopper pin 22c is configured as a stopper with which a pin 9b of the unit amount converter member 9 to be described later comes into contact to restrain movement of the pivotal portion 6 in a radially outer direction R1.

In order to fix the case 2 relative to the holder portion 4 which is rotating, a fixing weight 25 is attached to the case 2 in such a manner as to protrude in the radially outer direction R1 (see FIG. 2 and FIGS. 5-9). The fixing weight 25 can be mounted to either one of attaching holes 25a formed at two portions in the lateral face of the case 2. More particularly, a female thread is formed in the inner circumference of the attaching hole 25a, whereas a male thread is formed at an attaching portion of the fixing weight 25 to the attaching hole 25a. Therefore, with screw (threading) engagement between the fixing weight 25 and the respective attaching holes 25a, the fixing weight 25 is attached to the case 2. Since the fixing weight 25 is formed heavy, if the misalignment determining device 1 is operated with the fixing weight 25 being attached thereto, due to the weight of the fixing weight 25, the case 2 will rotate about the rotational axis MX, and the case 2 will be fixed with the fixing weight 25 being located perpendicularly downwards. Therefore, when the fixing weight 25 is located perpendicularly downwards due to its own weight, the indicator 33 will be oriented in a direction slightly inclined toward the fixing weight 25 from its frontal orientation, thereby to make it easier for a user to check the indicator 33 from the lateral side of the misalignment determining device 1. Incidentally, regarding the attaching holes 25a to which the fixing weight 25 is to be attached, a pair of such attaching holes 25a are provided at positions in line symmetry relative to the vertical line extending through the rotational axis MX as seen in the spindle axis CX direction (see FIG. 7). Thus, either one attaching hole 25a will be chosen depending on the standing position of the user and then the fixing weight 25 will be attached thereto. With this, regardless of the standing position on either lateral side of the misalignment determining device 1, it is possible to orient the indicator 33 of the dial gauge 3 to face the user.

As shown in FIG. 2, FIG. 3 and FIG. 5, the support portion 5 includes an attaching portion 51 to be attached to the rotary base 93 and an adjustment portion 52 for adjusting the inclination of the misalignment determining device 1 relative to the rotational axis MX direction. In the attaching portion 51 of the support portion 5, there are formed a plurality of magnet holes 57. Then, via magnets (not shown) pressed in or magnetically attached to these magnet holes 57, the support portion 5 is attached to the rotary base 93 (see FIG. 9). In the attaching portion 51 and the adjustment portion 52, there are formed a plurality of attaching holes 51a for fixing the support portion 5 to the holder portion 4. As screws 51b are screwed (threaded) into the female screw holes of the holder portion 4 in such a manner that heads of the screws 51b may be located on more holder portion 4 side than an adjustment slit 53 which will be described later, the support portion 5 is fixed to the holder portion 4 to be rotatable in unison with this holder portion 4.

The adjustment portion 52 includes an adjustment slit 53 cut out along the direction perpendicular to the rotational axis MX direction and an adjustment pressing portion 54 configured to press one of opposed faces of the adjustment slit 53 which face is closer to the holder portion 4, thereby to open the adjustment slit 53. The adjustment slit 53 includes an enlarged portion 53b which is formed wide at a position away from the rotational axis MX in the radially outer direction R1. The enlarged portion 53b is formed at one end portion of the adjustment slit 53 in the radial direction R. The other end portion of the adjustment slit 53 in the radial direction R is communicated with the outside of the support portion 5 in the radially outer direction R1.

The adjustment pressing portion 54 is constituted of a tapered pressing face 54a that extends away from the rotational axis MX in the radially outer direction R1. The adjustment pressing portion 54 is disposed at a position opposite the enlarged portion 53b of the adjustment slit 53 across the rotational axis MX. Further, there is provided an adjustment handle 55 that extends through the support portion 5 in the radially outer direction R1 and that also has, at its leading end, a ball 55a which comes into contact with the adjustment pressing portion 54. The adjustment handle 55 has a male screw which can be screwed (threaded) with a female screw formed in the support portion 5. In operation, as the adjustment handle 55 is screwed in toward the radially inner direction R2, the ball 55a comes into contact with the adjustment pressing portion 54 constituted of the tapered pressing face 54a, so that the adjustment slit 53 will be progressively opened or widened in the rotational axis MX direction and the support portion 5 will be progressively inclined away from the holder portion 4, with the enlarged portion 53b of the adjustment slit 53 acting as the "fulcrum". With this, the inclination of the misalignment determining device 1 as a whole can be finely adjusted in accordance with a screwing-in amount of the adjustment handle 55.

The pivotal portion 6 is attached eccentrically relative to the rotational axis MX and extends along the rotational axis MX direction such that the pivotal portion 6 carries, at its leading end, a determining portion 61 which pivots about an eccentric axis HX parallel with the rotational axis MX and is held to the leading end portion 41 of the holder portion 4 via the unit amount converter member 9. The pivotal portion 6 includes the determining portion 61 which is formed spherical and configured to come into contact with a determination target and a transmission portion 62 which transmits a pivot amount of the determining portion 61. Apart of the transmission portion 62 is engaged with the unit amount converter member 9, so that the pivot amount transmitted from the transmission portion 62 may be transmitted directly to the unit amount converter member 9. The unit amount converter member 9 is pivotally supported by a pivot shaft 63 fixed to the leading end portion 41 of the holder portion 4. The pivot shaft 63 extends through the fixing portion 41b of the holder portion 4 and has its leading end 63a inserted in the unit amount converter member 9 (see FIG. 4). Further, a leading end 63a of the pivot shaft 63 is formed conical and this leading end 63a is supported to a bearing 9a provided in the unit amount converter member 9. Namely, the unit amount converter member 9 to which the pivot amount has been transmitted from the transmission portion 62 of the pivotal portion 6 can be pivoted relative to the holder portion 4 about the pivot shaft 63 via a pivot bearing constituted of the pivot shaft 63 and the bearing 9a.

Further, the unit amount converter member 9 includes a pin 9b which comes into contact with a slide pin 72 of the lever member 7 which will be described later. This pin 9b protrudes in the direction which intersects the rotational axis MX direction and in the attaching direction of the dial gauge 3 (see FIG. 3). With a pivotal movement of the pivotal portion 6, the unit amount converter member 9 is pivoted about the pivot shaft 63 and the pin 9b comes into contact with the slide pin 72 to be described later, whereby the pivot amount of the pivotal portion 6 is transmitted to the lever member 7. More particularly, the point of contact of the determining portion 61 of the pivotal portion 6 relative to the determination target acts as the force point and the point of first contact (first contact point) between the pin 9b and the slide pin 72 acts as the action point, and the unit amount converter member 9 pivots about the pivot shaft 63 acting as the fulcrum. Therefore, the pivot amount of the pivotal portion 6 will be transmitted to the lever member 7 in proportion with the ratio: (distance between first contact point and pivot shaft 63)/(distance between contact portion of determining portion 61 of pivotal portion 6 and pivot shaft 63).

The lever member 7 extends in the intersecting direction intersecting the rotational axis MX and in the attaching direction of the dial gauge 3, at a position closer to the base end side (support portion 5 side) than the pivotal portion 6 and the lever member 7 is held in the holder portion 4 as being accommodated in the accommodating portion 41a. Specifically, the lever member 7 is pivotable relative to the holder portion 4 about a pivot shaft 71 via a pivot bearing constituted of this pivot shaft 71 (an example of pivot axis) and a bearing (not shown), like the unit amount converter member 9. This pivot shaft 71 is parallel with the pivot shaft 63 of the unit amount converter member 9 and extends at right angles with the rotational axis MX direction and with the extending direction of the lever member 7. Further, to the lever member 7, there is fixed a slide pin 72 that is arranged along the support shaft 71. Further, on the side opposed to the slide member 8 at the end portion of the lever member 7 opposite to the pivot shaft 71, a spherical ball portion 73 is fixed in the direction along the rotational axis MX direction. As this ball portion 73 comes into contact with the slide member 8, the pivot amount of the pivotal portion 6 is transmitted to the slide member 8 via the unit amount converter member 9 and the lever member 7.

Since the pin 9b of the unit amount converter member 9 described above comes into contact with the slide pin 72, the point of first contact (first contact point) between the pin 9b and the slide pin 72 acts as the force point and the point of second contact (second contact point) between the ball portion 73 and the slide member 8 acts as the action point, and the lever member 7 pivots about the pivot shaft 71 acting as the fulcrum. Thus, the pivot amount of the lever member 7 is transmitted to the slide member 8 in proportion to the ratio: (distance between second contact point and pivot shaft 71)/(distance between first contact point and pivot shaft 71). When the size of the lever member 7 is kept constant, namely, when the distance between the second contact point and the pivot shaft 71 is kept constant, in proportion with the ratio: (distance between first contact point and pivot shaft 63)/((distance between contact point of determining portion 61 of pivotal portion 6 with determination target and pivot shaft 63)×(distance between first contact point and pivot shaft 71)), the pivot amount of the pivotal portion 6 is transmitted to the slide member 8. Therefore, if the position of the first contact point is set such that the greater the length of the pivotal portion 6 in the rotational axis MX direction, the smaller the ratio: (distance from first contact point to pivot shaft 71)/(distance from first contact point to pivot shaft 63), the pivot amount of the pivotal portion 6 can be converted into an appropriate movement amount of the slide member 8 and transmitted as such, without increasing the size of the lever member 7. With provision of the unit amount converter member 9 in this way and with change made, if needed, in the shape of the unit amount converter member 9 and/or the position of the slide pin 72, it becomes possible to change the unit movement amount of the slide member 8 relative to the unit pivot amount of the pivotal portion 6, without changing the size of the lever member 7.

The slide member 8 is formed cylindrical and is accommodated within the through hole 23 of the case 2 at a position on more base end side (support portion 5 side) than the lever member 7. More particularly, the slide member 8 is supported via the third bearing B3 in the radially outer direction R1 of the bearing support body 21 described above and is configured to be movable along the rotational axis MX direction. In the outer face of the slide member 8, a spherical member 8a is embedded, so that this spherical member 8a can slide or roll along a guide groove 2b formed in the opening at the leading end side (pivotal portion 6 side) of the case 2. As this spherical member 8a slides or rolls along the guide groove 2b, the slide member 8 slides along the rotational axis MX direction without rotating relieve to the case 2.

At one end portion (end portion on the side of the pivotal portion 6) of the slide member 8, there is formed a contact portion 8b having a contact face with which the ball portion 73 of the lever member 7 comes into contact along the rotational axis MX direction. At the other end portion (end portion on the side of the support portion 5) of the slide member 8, there is provided, along the circumferential direction, an inclined portion 8c with which a stylus 32 of the dial gauge 3 comes into contact and which extends closer to the rotational axis MX as it extends toward the base end side (support portion 5 side) of the holder portion 4. Under an initial state when no force is applied to the determining portion 61 of the pivotal portion 6, due to a pressing force on the protruding side of the dial gauge 3, the stylus 32 presses the inclined portion 8c, so that the slide member 8 is located on most pivotal portion 6 side and the pin 9b of the unit amount converter member 9 is placed in contact with the stopper pin 22c (see FIG. 3). From this state, if the pivotal portion 6 is pivoted, the slide member 8 to which the pivot amount of the pivotal portion 6 has been transmitted will move toward the support portion 5 side along the rotational axis MX direction, against the pressing force on the protruding side of the dial gauge 3 and the stylus 32 of the dial gauge 3 will be retracted along the inclined portion 8c of the slide member 8 (see FIG. 10).

In this way, if the slide member 8 is provided with the inclined portion 8c, the dial gauge 3 will detect the movement amount of the slide member 8 in the rotational axis MX direction as a movement amount in the direction perpendicular to the rotational axis MX direction. Therefore, in the case of using a spindle type dial gauge 3 as employed in the instant embodiment, it becomes possible to dispose the dial gauge 3 in the direction perpendicular to the rotational axis MX direction in the outer face of the case 2. Consequently, there occurs no increase in the size in the rotational axis MX direction due to the dial gauge 3. Moreover, since the outer face of the stylus 32 of the dial gauge 3 is formed arcuate in its cross section, the contact between the stylus 32 and the inclined portion 8c can take place smoothly, so that increase of the service lives of the stylus 32 and the slide member 8 can be achieved.

(Determining Method)

Figure 10:
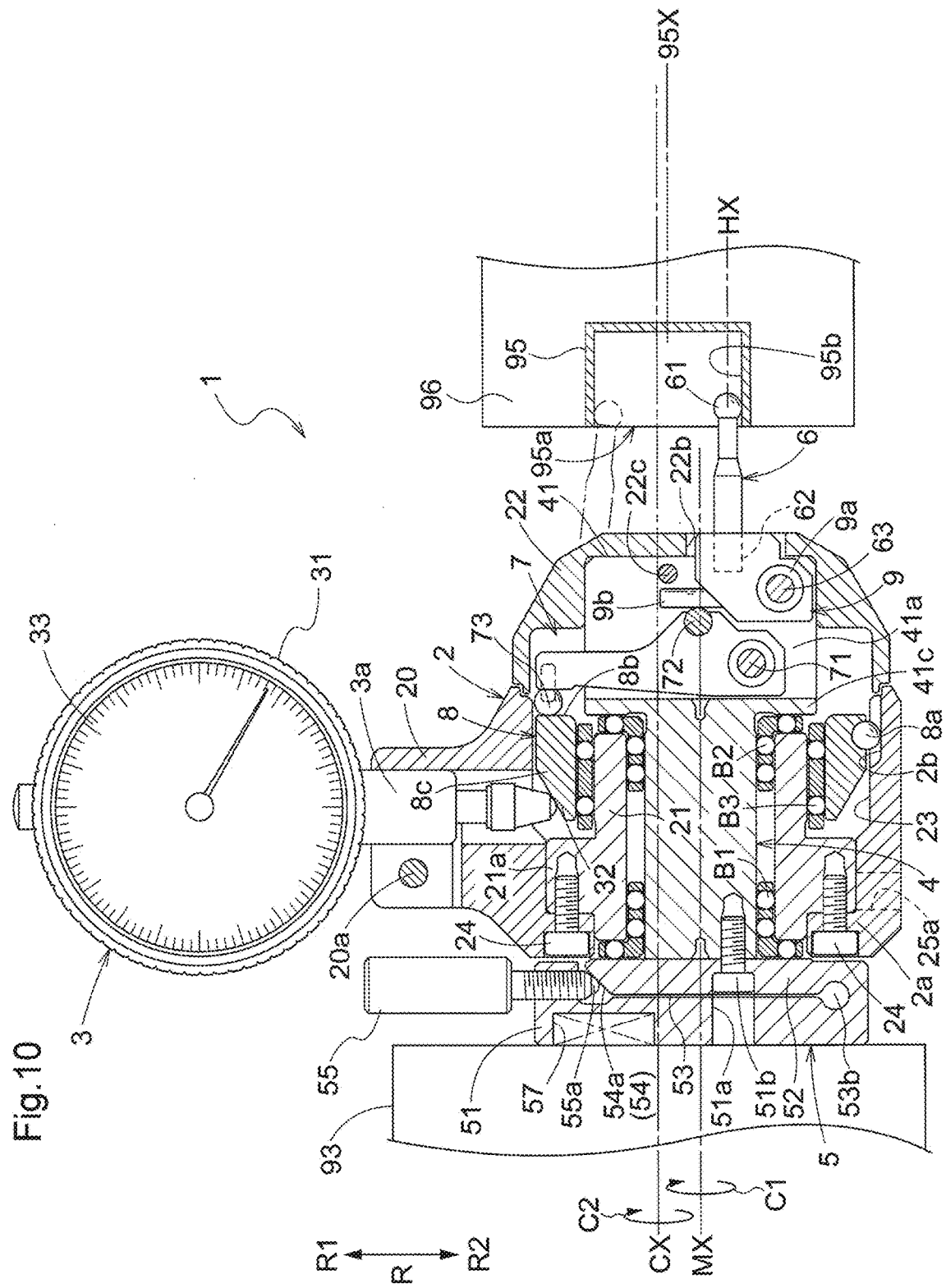
FIG. 10 is a vertical section view for explaining operations of the misalignment determining device.

Next, there will be explained determination of misalignment of the tool holder mounting portion 95 with using the misalignment determining device 1. As shown in FIG. 3, firstly, in the inner circumference of the tool holder mounting portion 95, there is formed a guide face 95b having a circular cross section, with which the determining portion 61 of the pivotal portion 6 comes into contact. The misalignment determining device 1 will be attached to the rotary base 93. Then, as shown in FIG. 10, the tool rest 94 will be moved along the spindle axis CX direction to a position where the determining portion 61 of the pivotal portion 6 comes into contact with the guide face 95b. In the course of this, while making sure occurrence of contact between the guide face 95b and the determining portion 61 via checking a swing of the indicator 33 of the dial gauge 3 as an indication thereof, the attaching position of the misalignment determining device 1 relative to the rotary base 93 will be adjusted and finally with screwing-in of the adjustment handle 55, the misalignment determining device 1 as a whole will be inclined for making a fine adjustment. Next, by driving the rotary drive device 90 with aligning the determining portion 61 of the pivotal portion 6 with the guide face 95b, the support portion 5, the holder portion 4, the lever member 7, the unit amount converter member 9 and the pivotal portion 6 will be rotated together for determining misalignment of the tool holder mounting portion 95.

When the rotary drive device 90 is rotatably driven, in association with rotation of the rotary base 93, the misalignment determining device 1 will revolve about the spindle axis CX along the second circumferential direction C2 and will also spin about the rotational axis MX along the first circumferential direction C1. In the course of this, due to the weight of the fixing weight 25, the case 2 and the dial gauge 3 do not rotate, whereas the support portion 5, the holder portion 4, the lever member 7, the unit amount converter member 9 and the pivotal portion 6 will rotate together with the rotary base 93 about the rotational axis MX. Incidentally, the pivotal portion 6 becomes a revolution trajectory of the eccentric axis HX which is located more in the radially outer direction R1 than a revolution trajectory of the rotational axis MX.

Figure 11:
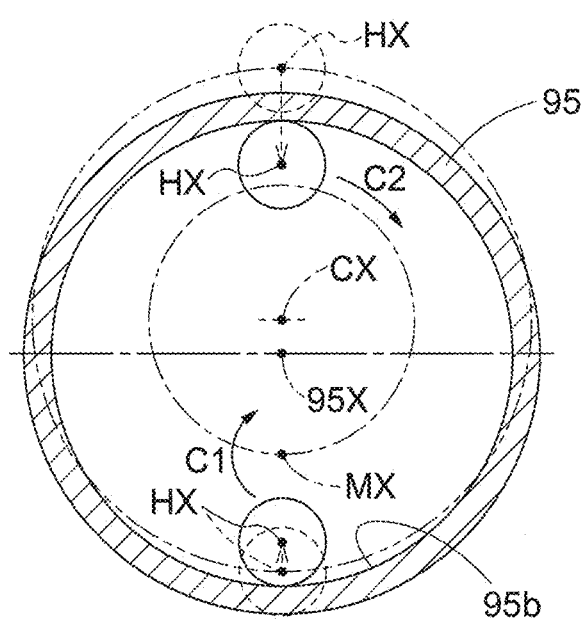
FIG. 11 is a diagram view for schematically explaining operations of the misalignment determining device.

In case the center 95X of the tool holder mounting portion 95 is not in agreement with the spindle axis CX, there will be presented such a condition as shown in FIG. 11 for instance. In FIG. 11, the one-dot chain line represents the revolution trajectory of the rotational axis MX, whereas the two-dot chain line represents the revolution trajectory of the eccentric axis HX. Also, in FIG. 11, the broken line circle represents the determining portion 61 of the pivotal portion 6 under the condition not in contact with the guide face 95b of the tool holder mounting portion 95 (free rotation condition). The solid line circle represents the determining portion 61 of the pivotal portion 6 under the condition in contact with the guide portion 95b of the tool holder mounting portion 95. As shown in the same drawing, in case the center 95X of the tool holder mounting portions 95 is not in agreement with the spindle axis CX, an amount of turn of the determining portion 61 obstructed by the guide face 95b of the tool holder mounting portion 95 will differ, depending on the circumferential location. Namely, the pivot amount of the pivotal portion 6 agrees to a movement amount of moving from the determining portion 61 indicted by the broken line to the determining portion 61 indicated by the solid line, the pivot amount shown on the upper side in the illustration being greater than the pivot amount shown on the lower side in the illustration. This change of pivot amount will be transmitted to the determining portion 61 in association with turning of the determining portion 61.

As shown in FIG. 10, in association with a pivotal movement of the determining portion 61, the pivot amount will be transmitted via the transmission portion 62 to the unit amount converter member 9, so that the unit amount converter member 9 will be pivoted about the pivot shaft 63 and the pin 9B will move along the rotational axis MX direction. And, this pivot amount of the unit amount converter member 9 will be transmitted to the slide pin 72 of the lever member 7 placed in contact with the pin 9b and the lever member 7 will pivot about the pivot shaft 71 and the ball portion 73 will move along the rotational axis MX direction. This pivot amount of the lever member 7 will be transmitted to the contact portion 8b of the slide member 8 placed in contact with the ball portion 73 and the slide member 8 will slide along the rotational axis MX direction. Then, the stylus 32 of the dial gauge 3 placed in contact with the inclined portion 8c of the slide member 8 will detect the movement amount in the direction perpendicular to the rotational axis MX direction based on the movement amount of the slide member 8 in the rotational axis MX direction as the pivot amount of the pivotal portion 61. Incidentally, the pivotal movement of the pivotal portion 6 in the radially outer direction R1 is restrained as the pin 9b comes into contact with the stopper pin 22c and the pivotal movement of the pivotal portion 6 in the radially inner direction R2 is restrained as the lever member 7 comes into contact with the flange portion 41c.

Since the pivot amount of the determining portion 61 is detected by the dial gauge 3 in the manner described above, when the pivot amount is not constant, the detection value of the dial gauge 3 will become not constant. In this case, by moving the tool rest 94 in the direction perpendicular to the rotational axis MX until the detection value of the dial gauge 3 (the pivot amount of the determining portion 61) becomes constant or comes within a predetermined range, agreement can be made between the center 95X of the tool holder mounting portion 95 and the spindle axis CX. As described above, the misalignment determining device 1 according to the instant embodiment can determine misalignment between the center 95X of the tool holder mounting portion 95 and the spindle axis CX in case the detection value of the dial gauge 3 is not constant and can determine absence of misalignment between the center 95X of the tool holder mounting portion 95 and the spindle axis CX in case the detection value of the dial gauge 3 becomes constant. With this, the reference point (alignment) of the center 95X of the tool holder mounting portion 95 is made accurate.

As described above, in the instant embodiment, if there exists misalignment with a determination target, the pivot amount of the determining portion 61 of the pivotal portion 6 becomes not constant, and this pivot amount is transmitted to the slide member 8 via the lever member 7 which rotates in synchronism with the holder portion 4. And, in association with a movement of the slide member 8, the dial gauge 3 detects the pivot amount. Namely, the arrangement is such that the pivotal portion 6 held to the leading end side of the holder portion 4 rotated about the rotational axis MX is pivoted and its pivot amount transmitted to the lever member 7 extending in the direction intersecting the rotational axis MX direction is detected as a movement amount of the slide member 8. In this way, since the extending direction of the lever member 7 to which the pivot amount of the pivotal portion 6 is transmitted is a direction intersecting the rotational axis MX direction, the size in the rotational axis MX direction can be made short. Consequently, the misalignment determining device 1 can be used even for a lathe in which the distance between the tool keeper 96 (tool holder mounting portions 95) and the chuck 91 is limited.

Moreover, since the slide member 8 and the stylus 32 of the dial gauge 3 are placed in contact with each other in this arrangement, simply by changing the shape of the slide member 8, it is possible to cope with not only the spindle type dial gauge 3, but also the lever type dial gauge whose pointer pivots depending on the pivot amount of the stylus 32.

Next, further embodiments will be explained only in their respects differing from the foregoing embodiment. Incidentally, for easier understanding of the drawings, explanation will be made with using same names and marks for same members.

Further Embodiment 1

Figure 12:
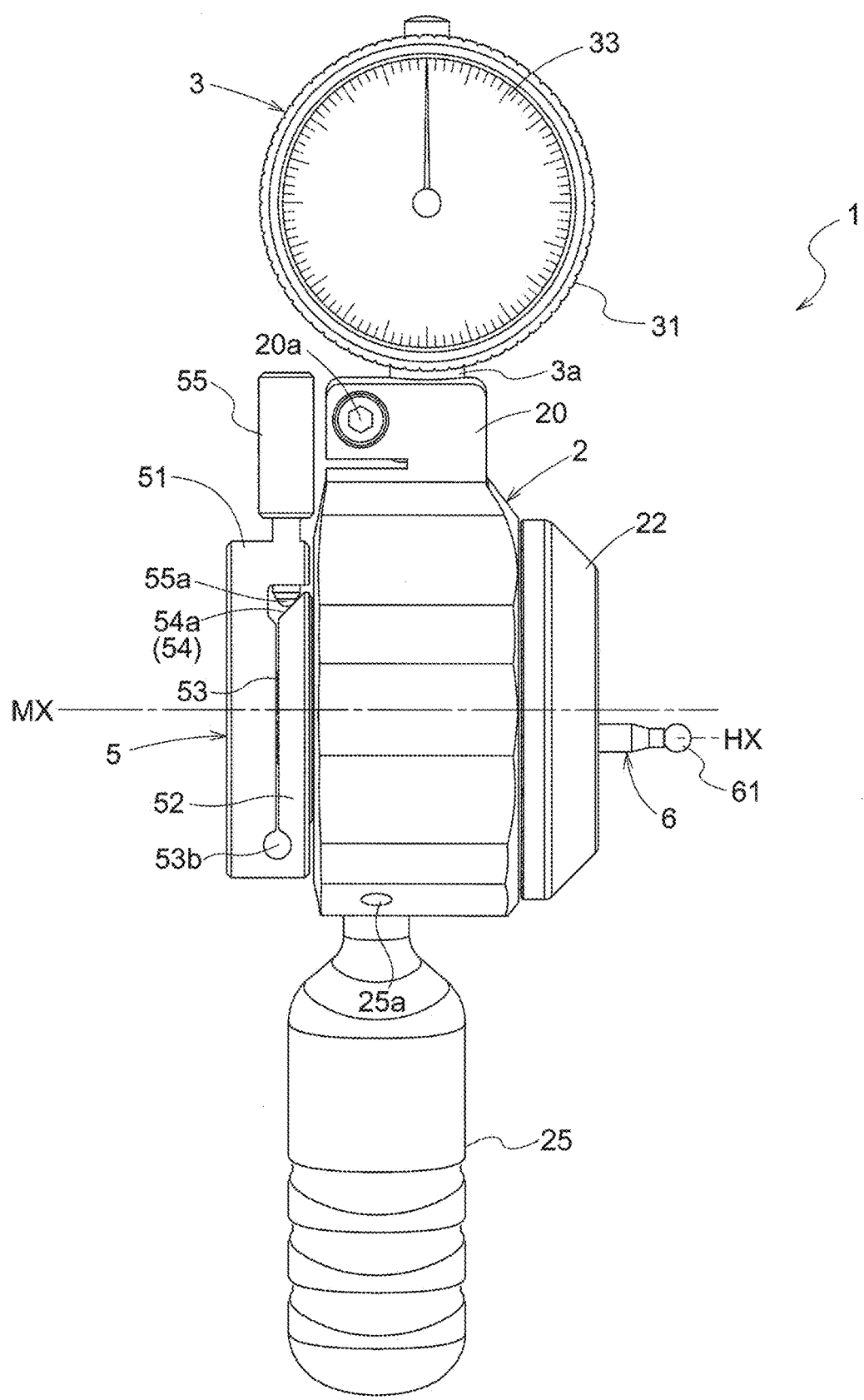
FIG. 12 is a front view showing a misalignment determining device relating to Further Embodiment 1.
Figure 13:
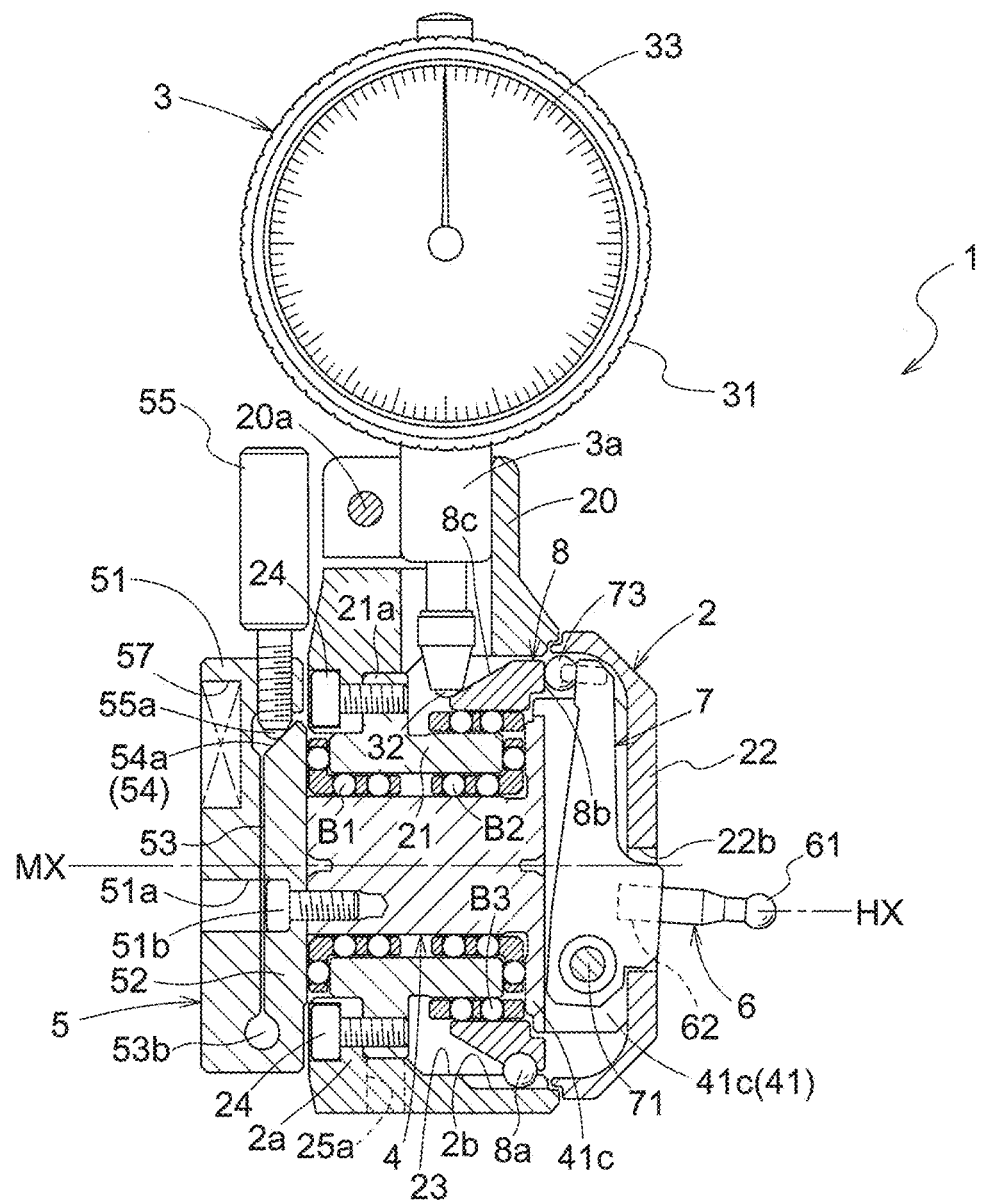
FIG. 13 is a vertical section view showing the misalignment determining device relating to Further Embodiment 1.

As shown in FIGS. 12-13, the unit amount converter member 9 used in the foregoing embodiment may be omitted. In this embodiment, a part of the transmission portion 62 of the pivotal portion 6 is directly engaged with the lever member 7. In this case, the point of contact of the determining portion 61 of the pivotal portion 6 with a determination target acts as the force point and the point of contact between the ball portion 73 and the slide member 8 acts as the action point and the lever member 7 pivots about the pivot shaft 71 acting as the fulcrum. Therefore, in proportion with a ratio: (distance between contact point between ball portion 73 and slide member 8 and pivot shaft 71)/(distance between contact point of determining portion 61 of pivotal portion 6 relative to determination target and pivot shaft 71), the pivot amount of the pivotal portion 6 will be transmitted to the lever member 7. Namely, in this embodiment, in case the size of the pivot portion 6 in the rotational axis MX direction is increased, there arises a need to increase the distance between the contact point between the ball portion 73 and the slide member 8 and the pivot shaft 71, thus being disadvantageous for compactization in the radial size. Notwithstanding, in this embodiment, since the unit amount converter member 9 is omitted from the foregoing embodiment, the size in the rotational axis MX direction can be made further shorter. In this way, in the front view of FIG. 12 relating to this embodiment, the size of the lid portion 22 is shorter in the rotational axis MX direction, in comparison with the front view illustration of FIG. 2 relating to the foregoing embodiment.

Further Embodiment 2

As shown in FIG. 14, the inclined portion 8c of the slide member 8 in the foregoing embodiment may be omitted and may be constituted of a slide member 8A having a rectangular cross section. In this case, there will be employed a lever type dial gauge 3A capable of detecting a movement amount of the slide member 8 in the rotational axis MX direction.

OTHER EMBODIMENTS (1) In place of the first bearing B1, the second bearing B2 and the bearing support body 21 described above, between the holder portion 4 and the case 2, there may be provided a roller bearing having a freely rotatable inner ring pressed into the holder portion 4 and an outer ring pressed into the case 2.

(2) With omission of the adjustment portion 52 of the support portion 5 described above, it is possible to arrange such that with adjustment of only the attaching position of the misalignment determining device 1 relative to the rotary base 93, the determining portion 61 of the pivotal portion 6 is caused to come into contact with the guide face 95b.

(3) The holder portion 4 and the support portion 5 described above may be formed integral to each other.

INDUSTRIAL APPLICABILITY

The present invention is applicable to a misalignment determining device for determining misalignment of a center of a lathe, a cylindrical grinder, etc.

REFERENCE SIGNS LIST

1: misalignment determining device
2: case
3: dial gauge
4: holder portion
5: support portion
6: pivotal portion
7: lever member
8: slide member
8c: inclined portion
9: unit amount converter member
32: stylus
71: pivot shaft (pivot axis)
MX: rotational axis (axis)

The invention claimed is:

1. A misalignment determining device comprising:
a tubular case having a through hole extending along an axis;
a dial gauge fixed to the case with a graduation scale portion thereof being exposed from the case and configured to determine a change amount of a distance;
a holder portion inserted to the through hole and rotatable relative to the case coaxially with the axis;
a support portion that supports the holder portion on a base end side of the holder portion;
a pivotal portion pivotable as being held to a leading end side of the holder portion;
a lever member extending along an intersecting direction intersecting the axial direction at a position which is on the leading end side and which also is on a side closer to the base end side than the pivotal portion is, the lever member being held to the holder portion in such a manner to be pivotable about a pivot axis which is in a direction perpendicular to both the axial direction and the intersecting direction, a pivot amount of the pivotal portion being transmitted to the lever member; and
a slide member accommodated in the case at a position on more base end side than the lever member and configured to come into contact with the lever member to be movable along the axial direction;
wherein the slide member is placed in contact with a stylus of the dial gauge;
as the pivotal portion and the lever member are rotated in synchronism with rotation of the holder portion, a pivot amount of the pivotal portion is transmitted to the slide member via the lever member; and based on a movement amount of the slide member along the axial direction, the dial gauge determines the pivot amount.

2. The misalignment determining device of claim 1, further comprising:
a unit amount converter member fixed to the pivotal portion at a position between the pivotal portion and the lever member and configured to change a unit movement amount of the slide member relative to a unit pivot amount of the pivotal portion.

3. The misalignment determining device of claim 1 or 2, wherein:
the stylus has an outer face having an arcuate cross section; and
a portion of the slide member which comes into contact with the stylus has an inclined portion which is closer to the axis as it extends toward the base end side.

* * * * *